United States Patent Office 2,891,830
Patented June 23, 1959

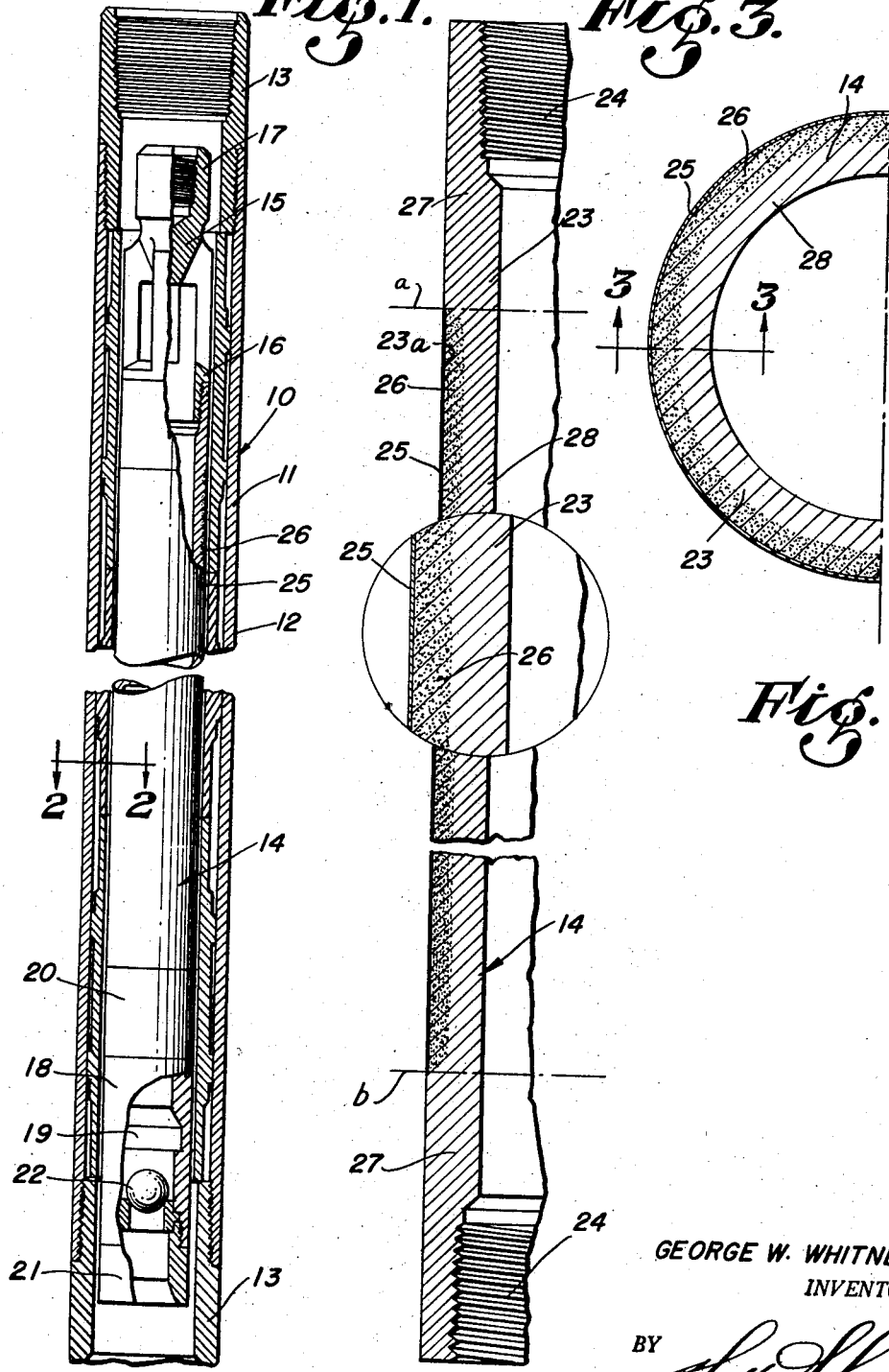

2,891,830

PUMP PLUNGER AND METHOD OF MAKING SAME

George W. Whitney, Huntington Park, Calif., assignor to The Youngstown Sheet and Tube Company, Youngstown, Ohio, a corporation of Ohio Application August 8, 1957, Serial No. 677,056

17 Claims. (Cl. 309—4)

This invention relates to piston pumps and relates in particular to pumps such as employed to pump oil from wells.

These piston pumps include a barrel and a piston arranged for relative reciprocation of which effects the pumping action. In pumps of this character, an end greatly to be desired, is to increase the resistance to wear of the relatively moving parts, especially the piston, thereby increasing the length of time the pump may be kept in service between the periods of shutdown for replacement or repair. To achieve this end, the pump pistons have been coated with a hard metal, such as chromium, but this has not been the solution of the problem for the reason that the hard and brittle chromium will flake or peel off from the pump piston, causing scoring and excess abrasion, defeating the original purpose of the hard metal coating.

It is an object of the invention to provide a piston and method of making the same, which piston has increased useful life for the reason that it has thereon a hard metal layer secured in such a manner that it will not, in ordinary conditions of use, crack, peel and/or flake off.

It is an object of the invention to provide a method of making a pump piston wherein the piston body is made from a metal capable of being hardened, the wearing surface of the piston, sometimes referred to as the pump plunger being then surface hardened, and a coating of hard metal being then applied to the hardened surface of the piston body.

It is a further object of the invention to provide a method of equipping a piston body with a hard, wear-resisting surface, wherein the outer surface of the piston body is surface hardened intermediate the ends thereof, so that the threaded ends of the piston body remain ductile, after which the hardened surface of the piston has a layer of hard metal applied thereon, such for example, as a surfact layer of chromium.

It is a further object of the invention to provide a piston, made by use of the method described in the foregoing, which piston has a hardened surface layer which merges with the unhardened metal of the piston contiguous thereto.

Further objects and advantages of the invention may be brought out in the following part of the specification wherein the detailed description is for the purpose of making a complete disclosure without intending, however, to limit the scope of the invention which is defined by the appended claims.

Referring to the accompanying drawings which are for illustrative purposes only:

Fig. 1 is a sectional view of an oil pump embodying a preferred form of my invention;

Fig. 2 is an enlarged sectional view through the pump piston taken as indicated by the line 2—2 of Fig. 1; and Fig. 3 is a sectional view, to slightly reduced scale, taken as indicated by the line 3—3 of Fig. 2.

The pump, as shown in Fig. 1, includes a barrel or cylinder 10 having an outer shell 11 in which tubular liners 12 are held in end to end relation by bushings 13 which are threaded into the ends of the tubular shell 11. These liners 12 form the cylinder wall proper of the barrel 10.

A plunger or piston 14 is slidable within the barrel 10. A fitting 15 is secured to the upper end of the piston 14. It has at its lower end an annular wall 16 which is screwed into the upper end of the piston 14 and at its upper end is provided with a threaded box 17 into which the pin end of a sucker rod may be screwed. The lower end of the piston 14 is connected to a traveling valve 18 which consists of a tubular valve body 19, a bushing 20 which is screwed into the lower end of the tubular valve body 19 and an annular seat member 21 on which the spherical closure member 22 of the valve seats.

The part referred to as the plunger or piston 14 comprises a steel tube 23 having threaded boxes 24 at the ends thereof. The tube 23 has thereon a layer 25 of chromium. This chromium 25 extends from a transverse plane *a* to a transverse plane *b* and is supported by a hardened layer 26 of the steel from which the tube 23 is made. This hardened layer 26 likewise extends from the transverse plane *a* to the transverse plane *b*, and therefore, is of the same length as the hard metal layer 25. The ends 27 of the tube 23 disposed outwardly of the transverse planes *a* and *b* are unhardened as also is the portion 28 of the tube 23 which extends through the hardened layer 26.

The method of making the piston 14 is as follows. The tubular member 23 is first machined from a metal capable of being hardened, such metal, in its unhardened state being strong and having some ductility. The outer portion of the tube 23 is then hardened, this hardened portion of the tube extending inwardly from its outer surface. Thereafter, a layer of chromium is applied to the surface of the outer hardened portion of the tube 23. This method provides on the surface of the tube 23 a layer of hard (and therefore brittle) metal which is supported by nonyieldable metal which consists of the hardened layer 26; therefore, localized pressure applied to the hard metal layer 25 will not result in a flexure thereof sufficient to cause the formation of cracks in the hard metal. Consequently, the integrity of the hard metal layer 25 will be maintained and it will not crack, flake, or peel off. Where a thin layer of chromium is plated on a yieldable metal, such as unhardened steel, a particle of relatively hard foreign material which might be, for example, a grain of sand or a particle of metal, pressed with great force against the chromium layer will produce an indentation because of the yieldability of the supporting metal. This indentation is accompanied by a localized flexure of the layer 25 of hard metal, causing the same to crack and eventually flake off. In the present invention, the extremely hard support, consisting of the hardened layer 26, will not yield under the pressure of the sand particle, referred to in the foregoing, and therefore, the layer of hard metal 25 is not permitted to flex. Conditions resulting in flaking off of the hard metal are thus avoided.

The tube 23 may be hardened in a number of different ways, but in the preferred practice of the invention this tube 23 is made of steel and the outer or surface layer 26 thereof is hardened by use of the induction hardening process. After the application of the layer 25 of hard metal, a final external polishing operation may be performed, but no heat treatment of the finished piston is required, but is contraindicated. The hardened layer 26 merges with the adjacent metal of the tube 23. In a successful and satisfactory use of the invention, the layer of hard metal is applied by use of the known electroplating process to a thickness of about six-thousandths of an inch.

I claim:

1. The method of making a piston, comprising: forming a piston body from a metal capable of being hardened; hardening at least the outer surface layer of said body; and applying to said outer surface layer a thin layer of hard metallic substance.

2. The method of making a piston, comprising: forming a piston body from a metal capable of being hardened; hardening at least the outer surface of said body; and electroplating on said outer surface layer a thin layer of hard metallic substance.

3. The method of making a piston, comprising: forming a piston body from a metal capable of being hardened; hardening at least the outer surface layer of said body from a transverse plane spaced inwardly from one end of said body to a transverse plane spaced inwardly from the other end of said body; and applying to said outer surface layer a thin layer of hard metallic substance.

4. The method of making a piston, comprising: forming from a metal capable of being hardened a piston body having a reduced diameter portion extending from a transverse plane spaced inwardly from one end of said body to a transverse plane spaced inwardly from the other end of said body, hardening at least the outer surface layer of said reduced diameter portion, and electroplating on said hardened outer surface layer a thin layer of hard metallic substance.

5. The method of making a piston, comprising: forming a piston body from a metal capable of being hardened; hardening the outer surface layer of said body from a transverse plane spaced inwardly from one end of said body to a transverse plane spaced inwardly from the other end of said body; and applying to said outer surface layer a thin layer of hard metallic substance.

6. The method of making a piston, comprising: forming a piston body from a metal capable of being hardened; hardening the outer surface of said body from a transverse plane spaced inwardly from one end of said body to a transverse plane spaced inwardly from the other end of said body; and electroplating on said outer surface layer a thin layer of hard metallic substance.

7. The method of making a piston, comprising: forming a piston body from a metal capable of being hardened; induction hardening at least the outer surface of said body; and electroplating on said outer surface layer a thin layer of hard metallic substance.

8. The method of making a piston, comprising: forming a piston body from a metal capable of being hardened; induction hardening at least the outer surface of said body from a transverse plane spaced inwardly from one end of said body to a transverse plane spaced inwardly from the other end of said body; and electroplating on said outer surface layer a thin layer of hard metallic substance.

9. The method of making a piston, comprising: forming a piston body from a metal capable of being hardened; induction hardening the outer surface of said body from a transverse plane spaced inwardly from one end of said body to a transverse plane spaced inwardly from the other end of said body; and electroplating on said outer surface layer a thin layer of hard metallic substance.

10. The method of making a piston, comprising: forming a piston comprising a steel tube with threaded boxes at the ends thereof; induction hardening the outer surface of said body from a transverse plane spaced inwardly from one end of said body to a transverse plane spaced inwardly from the other end of said body; and electroplating on said outer surface layer a thin layer of hard metallic substance.

11. The method of making a wear resistance part comprising: forming a steel body, hardening at least the layer of metal of said body which has thereon the wear receiving surface of the body; and electroplating a layer of chromium on said hardened layer of said body.

12. In a wear receiving member having a wear receiving surface: a steel body having the portion thereof contiguous to its wear receiving surface hardened; and a layer of hard metal substance on said wear receiving surface.

13. In a piston having an external wear receiving surface: a cylindrical body of metal capable of being hardened having the portion thereof contiguous to its wear receiving surface hardened; and a layer of hard metal substance on said wear receiving surface.

14. In a pump piston: a cylindrical steel body, there being a hardened layer of steel forming the external surface of said body; and a layer of chromium on said external surface of said body.

15. In a pump piston: a cylindrical steel body, there being an induction hardened layer of steel forming the external surface of said body; and a layer of electro-deposited chromium on said external surface of said body.

16. In a pump piston: a cylindrical steel body, there being a hardened layer of steel forming the external surface of said body from a transverse plane spaced inwardly from one end of said body to a transverse plane spaced inwardly from the other end of said body; and a layer of chromium on said external surface of said body.

17. In a pump piston: a cylindrical steel body, there being an induction hardened layer of steel forming the external surface of said body from a transverse plane spaced inwardly from one end of said body to a transverse plane spaced inwardly from the other end of said body; and a layer of electro-deposited chromium on said external surface of said body.

References Cited in the file of this patent

UNITED STATES PATENTS

| | | |
|---|---|---|
| 2,220,821 | Mancuso | Nov. 5, 1940 |
| 2,304,372 | O'Bannon | Dec. 8, 1942 |
| 2,355,669 | Moser | Aug. 15, 1944 |
| 2,403,455 | Phillips | July 9, 1946 |
| 2,499,951 | Harbison | Mar. 7, 1950 |